Aug. 10, 1926.  
J. HOFMANN  
1,595,156  
VEHICLE BOLSTER FITTING  
Filed Feb. 10, 1925
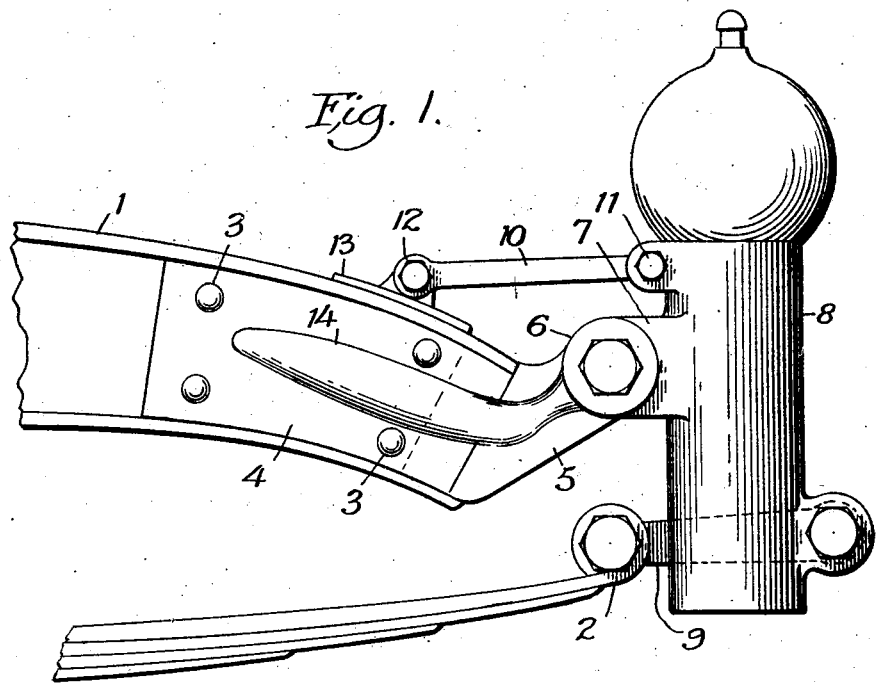
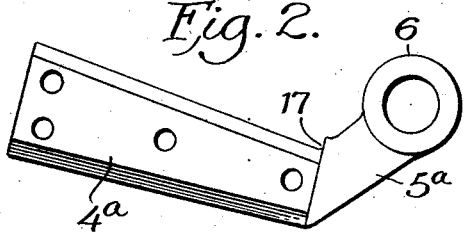
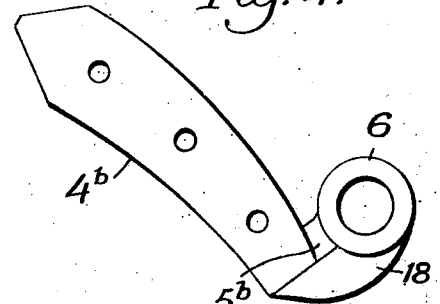
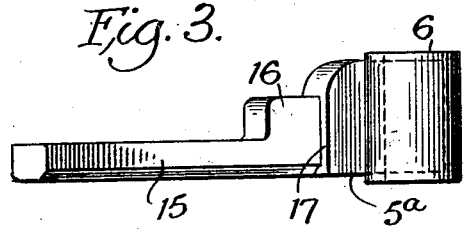
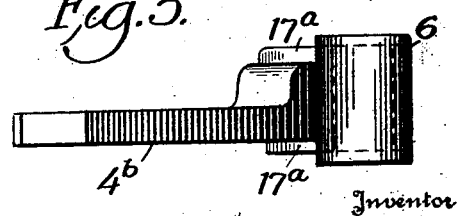
Inventor  
Josef Hofmann  
By Henry Orth  
Attorney Patented Aug. 10, 1926.

1,595,156

UNITED STATES PATENT OFFICE.

JOSEF HOFMANN, OF BAUMAROCHE, SWITZERLAND.

VEHICLE BOLSTER FITTING.

Application filed February 10, 1925. Serial No. 8,182.

In most automobiles the ends of the frame bolsters are turned down and fitted with an eye to which one end of the spring is connected. This eye is usually riveted to the downwardly curved end of the bolster.

When it is desired to secure a shock absorber between these elements, i. e., the bolster eye and spring eye, it is the practice to cut off the end of the bolster containing the bolster eye and secure the shock absorber in the end of the shortened end of the bolster and to the spring eye.

This defaces the bolster, and in the event the owner or a re-purchaser wishes to dispense with the shock absorber, it cannot be done without welding to the bolster a new end corresponding to that which has been cut off. The paint is considerably marred and the job is never as neat as the original.

If the bolster end is not cut off, the greater space required by the shock absorber unduly flexes the spring from its original position, resulting in the tilting of the axle, and this interferes with the steering gear. Another objection is that the raising of the car disturbs its balance and therefore its riding quality.

My invention is a fitting arranged to replace the bolster eye and overcome the objections referred to. The fitting has an upturned end carrying an eye to which one lug of the shock absorber may be attached, the other lug being attached to the spring eye, giving sufficient space for carrying the shock absorber without unduly flexing the spring.

Referring to the drawings, in which like parts are similarly designated—

Figure 1 shows one form of my fitting secured to a bolster end and supporting between it and the spring eye a shock absorber.

Fig. 2 is a side elevation of a modification for another make of car.

Fig. 3 is a plan of Fig. 2.

Fig. 4 is an elevation of a further modification for still another make of car, and Fig. 5 is a plan of Fig. 4.

In Figure 1 the end of the channel-shaped bolster is curved. The rivets that held the eye in the bolster and that were connected to the spring eye 2 have been taken out and the bolster eye removed, and my fitting put in its place, using the same rivet holes for new rivets 3.

My fitting comprises a shank 4, here shown as curved to fit the curved end of bolster 1, and at its narrower end continues into an up-turned neck 5 carrying at its extremity an eye 6 in which the upper lug 7 of a shock absorber casing 8 is connected. The spring eye 2 is connected to the lever 9, or other operating element of the shock absorber. A brace 10 is pivotally connected to the shock absorber casing 8 at 11 and its opposite end is pivotally connected to a plate 13 secured to the top flange of the bolster near its end. The brace prevents the casing 8 from tilting and holds it upright.

In some cases the channel from which the bolster is made is quite shallow, and in this case I provide a rib 14 extending along one side of the shank 4 and along the neck 5 to the eye 6.

This rib, however, is not always necessary, as will be seen from Figs. 2 and 3, where the shank is straight but is made thin at its one end, as at 15. At the opposite end the shank is thickened as at 16, so as to substantially close or fill the channel, there being a shoulder 17 substantially equal to the thickness of the channel metal that abuts against the end of the bolster or channel. From this shoulder extends the neck $5^a$ which in this instance is thicker than the shank and extends slightly beyond the end of the bolster channel flange.

In Figs. 4 and 5 I have shown another fitting in which the shank $4^b$ is curved, having its major portion thin, with a thickened end portion 16 and a short neck $5^b$. The neck in this instance is perpendicular to the curve of the shank, has shoulders $17^a$ and a reinforcing web 18.

By using my fitting with the upwardly directed eye, room is provided for the connection of the shock absorber without distorting the leaf spring, or only to such a slight extent that a reverse curve is not given to the end of the spring.

The fitting can be installed without mutilating the bolster, and can be removed in case shock absorbers are to be dispensed with.

When used, the shock absorbers need not be given an unsightly tilt.

I claim:—

1. Means for attaching a shock absorber to an automobile, comprising a fitting adapted to be fixed to the bolster thereof, said fitting having an upturned outer end portion extending above the end of the bolster and formed with an eye in which a lug on the shock absorber is adjustably connected, and a brace rod adapted to connect the shock absorber to the bolster above said fitting whereby the shock absorber may be fixed in its adjusted position.

2. Means for attaching shock absorbers to the springs and bolsters of automobiles, comprising a fitting adapted to be fixed to the side of a bolster and having an upturned end portion formed with an eye extending above the end of the bolster for the reception of a lug formed on the shock absorber to permit the latter to be adjustably connected to the bolster, a brace rod for connecting the upper part of the shock absorber to the bolster above the fitting, and a lever for pivotally connecting the shock absorber to the free end of a spring.

In testimony that I claim the foregoing as my invention, I have signed my name hereto.

JOSEF HOFMANN.